United States Patent [19]

Gill

[11] 4,226,145
[45] Oct. 7, 1980

[54] WIRE STRIPPER

[76] Inventor: John F. Gill, 919 Libby St., Clarkston, Wash. 99403

[21] Appl. No.: 51,849

[22] Filed: Jun. 25, 1979

[51] Int. Cl.³ .............................................. H02G 1/12
[52] U.S. Cl. .................................. 81/9.5 R; 30/90.1
[58] Field of Search ................. 81/9.5 R, 9.5 A, 9.51; 30/90.1; 7/107, 132, 134

[56] References Cited

U.S. PATENT DOCUMENTS

| | | | |
|---|---|---|---|
| 3,226,815 | 1/1966 | Kelly | 81/9.5 A |
| 3,336,666 | 8/1967 | Calkin | 30/90.1 |
| 3,654,647 | 4/1972 | Neff | 81/9.5 R |
| 3,731,561 | 5/1973 | Mongredien | 81/9.5 A |
| 3,733,627 | 5/1973 | Epstein | 81/9.5 R |
| 3,810,307 | 5/1974 | Mongredien | 30/90.1 |

FOREIGN PATENT DOCUMENTS 885764  10/1960  Canada ....................................... 7/107

Primary Examiner—Othell M. Simpson
Assistant Examiner—Roscoe V. Parker
Attorney, Agent, or Firm—Wells, St. John & Roberts

[57] ABSTRACT

A wire stripping tool with two facing jaw surfaces that slide over one another about a fixed pivot axis in a shearing motion. Arcuate grooves are formed in the facing surfaces at equal radii from the axis. The grooves lead inwardly from substantially radial leading edges. Wire fed between the leading edges is initially engaged by the leading edges and the insulative wire cover is cut through. Simultaneously, the wire is shifted in orientation from a position substantially perpendicular to the axis. One jaw member then operates against the body of the wire insulation while the opposite member slides the cut insulation axially off the wire core.

5 Claims, 6 Drawing Figures

WIRE STRIPPER

BACKGROUND OF THE INVENTION

The present invention is related to hand-held wire stripping devices.

Various instruments have been devised for the purpose of stripping the protective, insulative coating from electric wires. The common jack knife is typically used for this purpose. However, various specialty tools have all been devised for the sole purpose of stripping the insulative coating from wires.

Tools devised to make short work of wire stripping are usually similar in form to pliers or clippers, having jaws that close against each other along a radial plane. Such devices typically include opposed recesses with cutting edges designed to cut through the insulative material, leaving the wire core. Such wire stripping appliances are used in a two step procedure. First, the insulative covering is cut by squeezing the jaws together. Then the wire or the tool is pulled along an axis perpendicular to the jaws to cause sliding movement of the clipped portion of the insulation away from the wire core. The difficulty presented is that the wire must usually be hand held. Forces required to strip the wire insulation from the wire core are often too great to counteract merely by holding the opposite end of the wire. At best, extended use of such instruments leaves the user with sore hands. Furthermore, the space required for the stripping operation is frequently not available.

It therefore becomes desirable to obtain some form of wire stripping apparatus that is operable to clip the wire insulation and force the insulation from the wire core in one smooth operation and that requires use of only one hand. It It is also desirable to obtain such a tool that includes other capabilities relating to electrical wires and wiring such as a wire clipper and a solderless connector clamp.

DETAILED DESCRIPTION OF A PREFERRED EMBODIMENT

Figure 1:
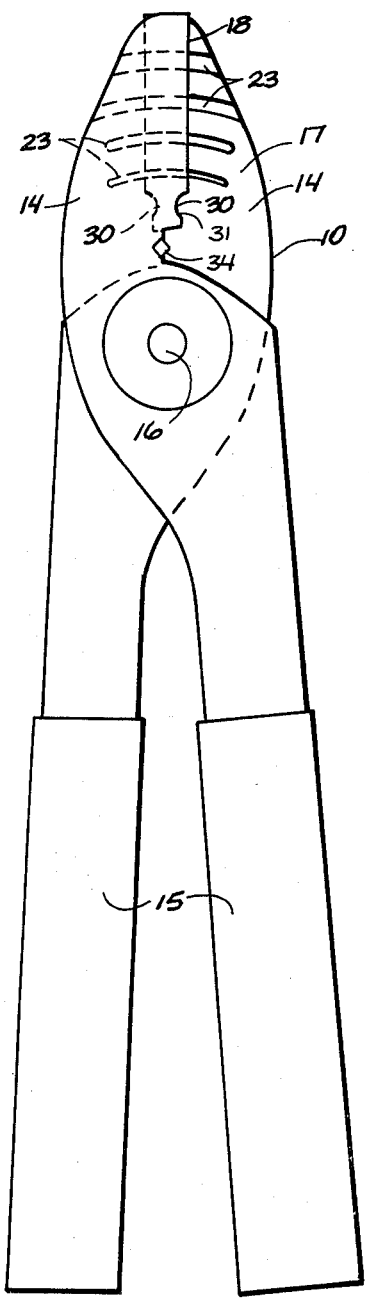
FIG. 1 is an elevation of the present stripper with the jaws thereof being in a closed position.

A preferred form of the present wire stripper is shown in the drawings and is generally designated therein by the reference character 10. The present wire stripper 10 is hand-held and is utilized for stripping the end portions of electrical wire insulation from the wire core. Use of the tool is primarily seen in household wiring as well as commercial and industrial applications where relatively heavy gauge wiring is utilized.

Figure 3:
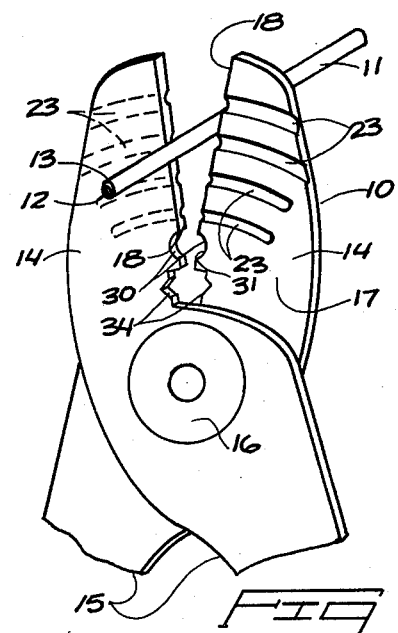
FIG. 3 is a fragmentary pictorial view illustrating the jaws in open condition with a short section or wire positioned between the jaw members.
Figure 4:
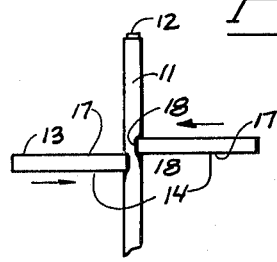
FIGS. 4 through 6 are diagrammatic representations illustrating operation of the present stripper.
Figure 5:
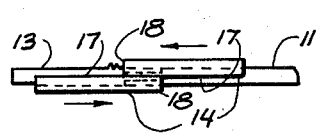
Figure 6:
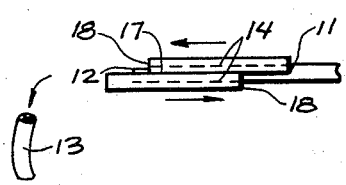

A short section of insulated electrical wire is illustrated in FIG. 3 at 11 and in the succession of operational views including FIGS. 4 through 6. The wire includes a metallic conductor core 12 and an outside covering of insulation 13. The conductor may be comprised of a single strand or multiple strands of an appropriate electrical conductive material while the insulation is typically composed of rubber, plastic, or other flexible insulative material. It is preferred that the insulative material be formed of a flexible material that is capable of being cut and slidably removed from the interior core.

The present wire stripping tool is comprised simply of two relatively movable components. The components are hand-held and pivot about a single pivot axis in the manner of common scissors or shears.

Each of the relatively movable elements includes a jaw member 14 on one side of the axis and a handle member 15 extending outwardly away from the axis on the opposite side of the jaws. Each jaw member and associated handle member is integral, being formed of a single piece of rigid metal. A pin 16 interconnects the jaws and handles to define the pivot axis and hold the two elements in movable juxtaposition.

The jaw members 14 include planar facing surfaces 17. The surfaces 17 are positioned in sliding engagement and facing one another along a plane perpendicular to the pivot axis. The two planar surfaces therefore slide over one another in a manner similar to the cutting surfaces of scissors or shears.

The planar surfaces 17 terminate at inward leading edges 18. The leading edges 18 are formed along planes parallel to the pivot axis and are preferably substantially radial thereto. The edges 18 overlap in the closed condition of the tool as shown in FIGS. 1, 5 and 6 and are spaced apart angularly in the open position as shown in FIGS. 3 and 4.

Figure 2:
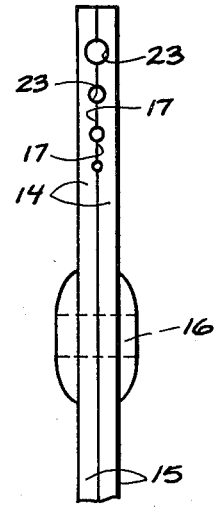
FIG. 2 is a fragmentary view of the stripper as seen from the right in FIG. 1.

The planar surfaces 17 each include a number of arcuate grooves 23. The grooves 23 are semi-circular in cross section and formed along surfaces 17 on a radius from the axis. The grooves are formed in matched pairs, with each pair combining to form a circular cross-sectional opening as shown in FIG. 2. The opening may lead partially into the jaw members or extend fully through, depending upon the radial relationship and spacing of the groove from the pivot axis.

Each matched pair of grooves 23 defines a cross-sectional circular diameter that is equal to or slightly greater than a conventional wire gauge size. Therefore, by providing several radially spaced sets of grooves, each of different cross-sectional diameter, I can provide a single tool that will effectively strip the insulation from wire of various sizes.

The leading edge 18 at the open ends of each groove forms a cutting surface that is utilized during operation to cut through the wire insulation. Adjacent surfaces of the leading edges 18 about the recesses formed by the grooves 23 are utilized to slide the cut insulation axially from the wire core (FIG. 6).

Operation of the present wire stripper is shown in the sequence of FIGS. 4 through 6. Prior to operation, the user grasps the tool in hand, spreading the handles apart to likewise spread the jaws 14. This brings the leading edges to the open position shown in FIG. 3. The user can then insert a short length of wire between the open jaws at a position where the adjacent grooves 23 correspond with the wire core diameter.

The handles are then brought together, pivoting the jaws to the FIG. 4 position. The insulation is cut during this movement, with the wire still oriented substantially parallel to the pivot axis for the jaws. The leading edges adjacent to the open sides of the grooves will cut through the insulation to the depth of the wire.

The oppositely moving jaws cut the insulation and simultaneously cause the wire to shift from the FIG. 4 orientation to the FIG. 5 relationship where the wire is substantially perpendicular to the jaw pivot axis. At this time, the oppositely moving leading edges serve to separate the cut insulation from the remaining insulation on the wire.

One leading edge will engage and push against the insulation on the other side of the cut, moving it axially off the wire core. The shorter piece of insulation 13 (FIG. 6) will be moved due to the difference in frictional contact between the wire core and remaining insulation. In other words, the leading edge on one jaw becomes anchored against the body of wire insulation on one side of the cut while the remaining oppositely moving leading edge acts against the opposite cut side to push the shorter section of insulation off of the wire core.

The present tool includes other provisions intended for use in electrical wiring operations. First, a shear or clipper 30 is located toward the pivot axis from the grooves 23. The shear is simply comprised of concave cutting edges 31 formed into the jaw leading edges 18. These cutting edges move past one another during closing of the jaws in a slicing action. The shear 30 is used to cut through both insulation and the wire core.

Intermediate the shear 30 and the pin 16 is a crimping arrangement 34. The crimper 34 is utilized for clamping or crimping solderless fasteners onto exposed wires. The crimper includes opposed, facing surfaces that are complementary to the exterior surface of a soldering connector. Clamping forces produced through the handles 15 bring the crimping surfaces together to compress a solderless connector against wires engaged therewith.

The above description and attached drawings are given by way of example to set forth a preferred form of the present invention while the following claims are intended to more precisely define the scope of my invention.

What I claim is:
1. A wire stripper, comprising:
   a pivot pin defining a fixed pivot axis;
   a first jaw member mounting the pivot pin and extending to one side of the pivot axis;
   a first handle member joined to the first jaw member and extending to an opposite side of the pivot axis;
   a second jaw member mounted to the pivot pin and extending to the one side of the pivot axis;
   a second handle member joined to the first jaw member and extending to the opposite side of the pivot axis;
   the first and second jaw members having facing planar surfaces arranged perpendicular to the pivot axis to slide over one another in a shearing motion in response to pivotal movement of the handle members about the pivot axis;
   oppositely facing leading edges extending substantially radially with respect to the fixed pivot axis along the first and second jaw members;
   an arcuate groove formed along the planar surface of each jaw member, extending along the planar surface from the leading edge thereof;
   wherein the grooves are formed along a single radius from the fixed pivot axis and face each other to define an opening of cross-sectional dimension substantially equal to a standard electrical wire diameter.

2. The wire stripper as defined by claim 1 wherein each of the jaw members includes a plurality of arcuate grooves generated about the pivot axis at different radii therefrom, and wherein the grooves are arranged in matching pairs along the planar surfaces and define cross-sectional diameters substantially equal to various standard wire diameters.

3. The wire stripper as defined by claim 1 further comprising shear means formed integrally within the jawmembers situated toward the pivot axis from the arcuate grooves for cutting through wire.

4. The wire stripper as defined by claim 1 further comprising crimper means formed integrally within the jaw members and situated toward the pivot axis from the arcuate grooves.

5. The wire stripper as defined by claim 1 wherein the leading edges adjacent the arcuate grooves are formed along planes substantially parallel to the pivot axis.

* * * * *